United States Patent
Kim et al.

(10) Patent No.: US 9,681,440 B2
(45) Date of Patent: Jun. 13, 2017

(54) METHOD AND DEVICE FOR SCHEDULING A WIRELESS PERSONAL AREA NETWORK

(75) Inventors: Suhwook Kim, Gyeonggi-do (KR);
Bonghoe Kim, Gyeonggi-do (KR);
Jaewon Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 14/117,934

(22) PCT Filed: Apr. 5, 2012

(86) PCT No.: PCT/KR2012/002569
§ 371 (c)(1),
(2), (4) Date: Nov. 15, 2013

(87) PCT Pub. No.: WO2012/165759
PCT Pub. Date: Dec. 6, 2012

(65) Prior Publication Data
US 2014/0092863 A1    Apr. 3, 2014

Related U.S. Application Data

(60) Provisional application No. 61/490,647, filed on May 27, 2011.

(51) Int. Cl.
H04W 72/04    (2009.01)
H04W 4/00     (2009.01)
H04W 84/18    (2009.01)

(52) U.S. Cl.
CPC ....... *H04W 72/0446* (2013.01); *H04W 4/008* (2013.01); *H04W 72/0453* (2013.01); *H04W 72/0406* (2013.01); *H04W 84/18* (2013.01)

(58) Field of Classification Search
None
See application file for complete search history.

(56) References Cited

U.S. PATENT DOCUMENTS 8,825,120 B2 *  9/2014  Chebbo et al. ............... 455/574
2002/0176445 A1  11/2002  Melpignano
(Continued)

FOREIGN PATENT DOCUMENTS

| KR | 10-2004-0002416 A | 1/2004 |
| KR | 10-0541640 B1 | 1/2006 |
| KR | 10-2010-0055865 A | 5/2010 |

OTHER PUBLICATIONS

International Preliminary Report on Patentability issued in corresponding International Patent Application No. PCT/KR2012/002569 dated Dec. 12, 2013.
(Continued)

*Primary Examiner* — Christopher Grey
*Assistant Examiner* — Wilfred Thomas
(74) *Attorney, Agent, or Firm* — Morgan, Lewis & Bockius LLP

(57) ABSTRACT

The present specification sets forth a method for a device to transmit data in a wireless personal area network (WPAN), comprising the steps of: transmitting a transmission-band request message for transceiving non-contention data between a first coordinator and a second coordinator, the second coordinator operating in a different frequency channel from the first coordinator; switching an operating channel to the different frequency channel; receiving transmission-band allocation information corresponding to the transmission-band request message from the second coordinator through the switched different frequency channel; and transceiving data to/from the second coordinator according to the transmission-band allocation information.

14 Claims, 8 Drawing Sheets

(56) References Cited

U.S. PATENT DOCUMENTS

| | | |
|---|---|---|
| 2003/0186713 A1* | 10/2003 | Sugaya et al. ............... 455/501 |
| 2005/0078646 A1 | 4/2005 | Hong et al. |
| 2009/0067389 A1* | 3/2009 | Lee .................. H04W 74/02 370/336 |
| 2009/0257410 A1* | 10/2009 | Liu ............................ 370/336 |
| 2009/0310514 A1* | 12/2009 | Jeon .................. H04W 36/12 370/254 |
| 2010/0110981 A1* | 5/2010 | Shao ................. H04W 76/023 370/328 |
| 2010/0124238 A1 | 5/2010 | Hong et al. |
| 2011/0007727 A1 | 1/2011 | Driesen et al. |
| 2011/0038343 A1* | 2/2011 | Bhatti et al. ................. 370/330 |
| 2011/0150042 A1* | 6/2011 | Liu ..................... H04B 1/713 375/133 |
| 2011/0176520 A1* | 7/2011 | Patel et al. ................... 370/336 |

OTHER PUBLICATIONS

Written Opinion and International Search Report issued in corresponding International Patent Application No. PCT/KR2012/002569 dated Oct. 29, 2012.

\* cited by examiner (a)     (b)

METHOD AND DEVICE FOR SCHEDULING A WIRELESS PERSONAL AREA NETWORK

TECHNICAL FIELD

The disclosure relates to a scheduling method and device in a wireless personal area network (hereinafter, referred to as a WPAN) and, more particularly, to a scheduling method and device using a guaranteed time slot (GTS).

BACKGROUND ART

Personal portable instruments may construct a low-rate wireless personal area network (hereinafter, referred to as an LR-WPAN) to perform communication.

An example of the LR-WPAN includes a network based on an IEEE 802.15.4 standard. The IEEE 802.15.4 standard uses binary phase-shift keying (BPSK) in a band of 868/915 MHz to provide a transmission rate of 20 Kbps and 40 Kbps. In a band of 2.45 GHz, the IEEE 802.15.4 standard uses offset quadrature phase-shift keying (O-QPSK) to provide a transmission rate of 250 Kbps. An IEEE 802.15.4b standard uses O-QPSK even in a band of 868/915 MHz to provide a transmission rate of 250 Kbps.

DISCLOSURE

Technical Problem

With increasing exhaustion of frequency resources, a necessity for a wireless system that is capable of operating while dynamically moving in various frequencies has come to the fore. A WPAN may also operate through a plurality of channels in various frequency bands. However, a currently defined IEEE 802.15.4 standard is limited in supporting such operation. In particular, it is not possible to allocate a transmission band for contention free operation when an operating channel is switched.

Therefore, an object of the disclosure is to provide a method of successively allocating transmission bands even when an operating channel of a device is switched. In addition, another object of the disclosure is to provide a method of guaranteeing uniform quality of service (QoS) through successive GTS allocation.

Technical Solution

According to an embodiment of the present invention, a data transmission method performed by a device in a wireless personal area network (WPAN) system is disclosed. The data transmission method may include transmitting a message for requesting a transmission band for contention-free transmission and reception of data to and from a second coordinator to a first coordinator, the second coordinator operating in a specific frequency channel different from a frequency channel in which the first coordinator operates, switching an operating channel to the specific frequency channel, receiving transmission band allocation information corresponding to the message from the second coordinator through the switched specific frequency channel, and transmitting and receiving data to and from the second coordinator according to the transmission band allocation information.

Preferably, the transmission band for contention-free transmission and reception of data may be a guaranteed time slot (GTS).

Preferably, the message may be a GTS request command.

Preferably, the GTS request command may include an indicator indicating that the GTS is requested from the second coordinator.

Preferably, the indicator may be contained in a GTS network field.

Preferably, the GTS request command may further include a channel number of the specific frequency channel and an identifier of the second coordinator.

Preferably, the transmission band allocation information may be received in a state of being contained in a beacon frame.

Preferably, the transmission band allocation information may be received through a GTS descriptor in the beacon frame.

Preferably, the WPAN system may be a medical body area network (MBAN) system.

According to another embodiment of the present invention, a transmission band allocation method in which a coordinator operating in a first frequency channel of a wireless personal area network (WPAN) system allocates a transmission band to a device is disclosed. The transmission band allocation method may include receiving information on a request for a transmission band for contention-free transmission and reception of data for the device from another coordinator communicating with the device through a second frequency channel, the second frequency channel being different from the first frequency channel, allocating the transmission band for contention-free transmission and reception of data based on the received information, and transmitting transmission band allocation information for the device through the first frequency channel.

Preferably, the transmission band for contention-free transmission and reception of data may be a guaranteed time slot (GTS).

Preferably, the information may include at least one selected from among an address of the device, an address of the another coordinator, and time information on which the device will change its operating frequency channel.

According to a further embodiment of the present invention, a mobile station of a wireless personal area network (WPAN) system is disclosed. The mobile station may include a transceiver for performing communication with a coordinator and a controller for controlling the transceiver.

The controller may control the transceiver to transmit a message for requesting a transmission band for contention-free transmission and reception of data to and from a second coordinator to a first coordinator, the second coordinator operating in a specific frequency channel different from a frequency channel in which the first coordinator operates.

Preferably, the controller may control an operating frequency channel to be switched to the specific frequency channel.

Preferably, the controller may control the transceiver to receive transmission band allocation information corresponding to the message from the second coordinator through the switched specific frequency channel.

The controller may control the transceiver to transmit and receive data to and from the second coordinator according to the transmission band allocation information.

The transmission band for contention-free transmission and reception of data may be a guaranteed time slot (GTS).

Advantageous Effects

According to the method of the disclosure, a transmission band may be successively allocated to a device participating in a WPAN even when an operating channel is switched.

BEST MODE

Figure 1:
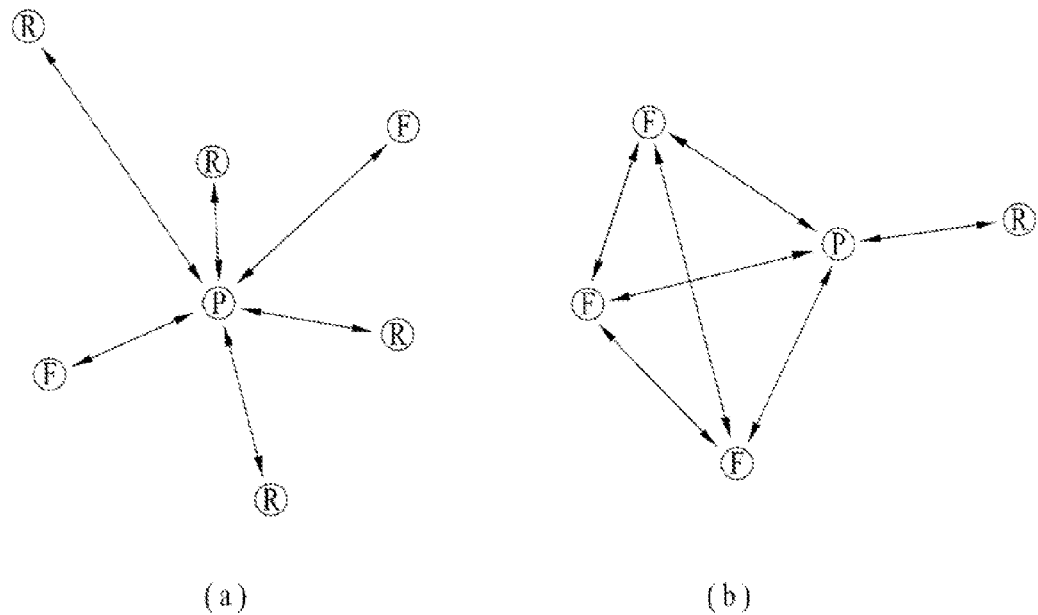
FIG. 1 is an illustrative view showing a network topology according to an IEEE 802.15.4 standard.

The terminology used herein is for the purpose of describing particular embodiments only and is not intended to limit of the present invention. Unless otherwise defined, all technical terms used herein have the same meaning as commonly understood by one of ordinary skill in the art to which the present invention pertains and will not be interpreted in an overly wide or narrow sense unless expressly so defined herein. If a term used herein is a wrong term by which one of ordinary skill in the art cannot correctly understand the present invention, the wrong term should be replaced by a technical term by which one of ordinary skill in the art can correctly understand the present invention. It will be further understood that terms, such as those defined in commonly used dictionaries, should be interpreted as having a meaning that is consistent with their meaning in the context of the relevant art and will not be interpreted in an overly narrow sense.

As used herein, the singular forms are intended to include the plural forms as well, unless context clearly indicates otherwise. It will be further understood that the terms "comprises" or "includes" are not intended to include all elements or all steps described herein, but do not preclude exclusion of some elements or steps described herein or addition of one or more other elements or steps.

In addition, the suffixes "module" and "unit" of elements herein are used for convenience of description and thus can be used interchangeably and do not have any distinguishable meanings or functions.

It will be understood that, although the terms first, second, etc. may be used herein to describe various elements, these elements should not be limited by these terms. These terms are used only to distinguish one element from another element. For example, a first element may be termed a second element and a second element may be termed a first element without departing from the teachings of the present invention.

Reference will now be made in detail to the embodiments of the present invention, examples of which are illustrated in the accompanying drawings, wherein like reference numerals refer to like elements throughout, and a repeated explanation thereof will not be given.

In the description of the present invention, certain detailed explanations of related art are omitted when it is deemed that they may unnecessarily obscure the essence of the invention. The features of the present invention will be more clearly understood from the accompanying drawings but should not be limited by the accompanying drawings.

Embodiments of the disclosure may be supported by standard documents for a system according to IEEE 802.15.4 that is a low-rate wireless personal area network (LR-WPAN) system. Alternatively, embodiments of the disclosure may be supported by standard documents disclosed for at least one selected from among an IEEE 802 system, a 3GPP system, 3GPP LTE and LTE-Advanced (LTE-A) system, and 3GPP2 system for wireless access. That is, steps or features that are not described may be supported by the above documents in order to clearly comprehend the features of the present invention in the embodiments of the disclosure. In addition, terminology used herein can be understood based on the standard documents.

Hereinafter, embodiments of the disclosure will be described in terms of IEEE 802.15.4 standard for clarity; however, technical concept of the invention in the disclosure is not limited thereto.

FIG. 1 is an illustrative view showing a network topology according to an IEEE 802.15.4 standard.

Two types of devices, such as a full function device (hereinafter, referred to as an FFD) and a reduced function device (hereinafter, referred to as an RFD), may participate in a network based on the IEEE 802.15.4 standard. Consequently, the network topology according to the IEEE 802.15.4 standard may be decided based on functions of the devices participating in the network. FIG. 1(a) illustrates a star topology and FIG. 1(b) illustrates a peer-to-peer topology.

The FFD is a full function device. For example, the FFD may communicate with an FFD or an RFD and may perform a function such as network initialization, node management, node information storage, etc. In particular, among FFDs, an FFD that operates such that other devices configure a network is referred to as a personal area network (PAN) coordinator (hereinafter, referred to as a coordinator). Thus, the network topology as described above may be configured by the FFD acting as the coordinator.

However, the RFD performs reduced functions as compared with functions of the FFD. In particular, an opposing device with which the RFD communicates is limited to an FFD. For this reason, the RFD cannot act as a coordinator. Thus, the FFD may be wholly responsible for a network function such that the RFD may have a stack structure with a small size and may conserve computing/memory resources. In particular, the RFD may be disconnected from a coordinator to enter a save (sleep) mode immediately after searching for a coordinator and transmitting data to the coordinator, and thus, may have significantly reduced power consumption and may operate for a long time using battery power.

Referring to FIG. 1, a device indicated by "F" denotes an FFD, a device indicated by "R" denotes an RFD, and a device indicated by "P" denotes an FFD acting as a coordinator.

In the star topology shown in FIG. 1(a), a plurality of devices communicates directly with a coordinator. In this case, the devices may each be a start point or end point of communication, whereas the coordinate may be a start point, an end point, or a router.

In the peer-to-peer topology shown in FIG. 1(b), each device may communicate with any other device in a network and may configure a more complex type of network such as a mesh network.

The star network may manage devices so as to maintain long operation under battery power. On the other hand, the peer-to-peer network may configure one or more data transmission paths, thereby achieving high data reliability and connection recognition rate.

Figure 2:
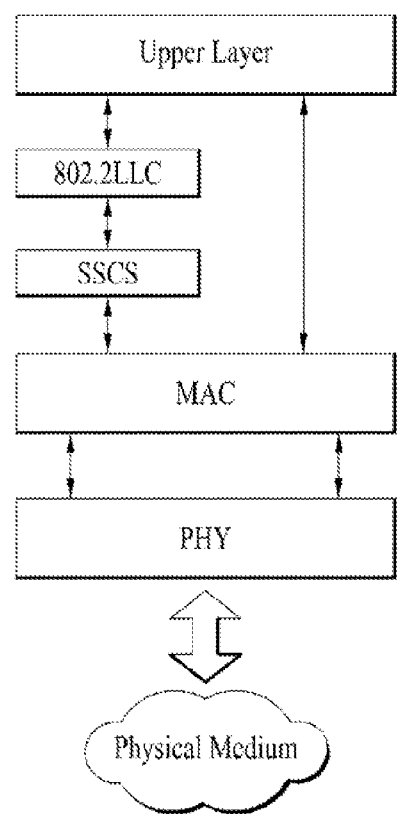
FIG. 2 is a view showing a structure of a protocol stack of the IEEE 802.15.4 standard corresponding to an example of an LR-WPAN system.

FIG. 2 is a view showing a structure of a protocol stack of the IEEE 802.15.4 standard corresponding to an example of an LR-WPAN system.

As can be seen from FIG. 2, the protocol stack includes a physical (PHY) layer, a medium access control (MAC) layer, and an upper layer.

The PHY layer includes a radio frequency (RF) transceiver and a related control mechanism. The PHY layer may provide a PHY data service for transmitting and receiving PHY protocol data units (PHY PDUs) through a physical channel and a PHY management service for management of the PHY layer.

The MAC layer provides access to a physical channel for data transmission. The MAC layer may provide a MAC data service for transmitting and receiving MAC protocol data units (MAC PDUs) through the PHY layer and a MAC management service for management of the MAC layer. The MAC layer may perform functions such as beacon management, channel access, guaranteed time slot (GTS) management, frame acknowledgement, security functions, etc.

The upper layer includes a network layer and an application layer. The network layer provides functions such as network configuration, processing, message routing, etc. The application layer provides a target function of a device. For example, an IEEE 802.15.4 device 100 may function as a reduced function device (RFD), a full function device (FFD), or a coordinator according to a type of program installed therein, that is, a type of program for processing data of the application layer.

FIG. 3 is a view a structure of a superframe of the IEEE 802.15.4 system corresponding to an example of the LR-WPAN system.

The structure of the superframe used in the LR-WPAN system may be decided by a coordinator. The coordinator transmits a superframe configured such that a beacon frame is located at a first slot. In a case in which the structure of the superframe is not used, the coordinator does not transmit beacon transmission.

Meanwhile, devices which will transmit data wait for the beacon frame transmitted by the coordinator. Upon receiving the beacon frame, the devices are synchronized with the structure of the superframe. The beacon frame is used to synchronize devices participating in a PAN established by the coordinator, to identify the PAN, and to indicate a structure of the superframe.

Hereinafter, a structure of a superframe which may be used for transmission and reception of data between devices will be described with reference to FIG. 3.

Devices on the LR-WPAN system contentionally perform media access to transmit and receive data using the superframe. However, in a case in which the coordinator participating in the WPAN allocates time slots to specific devices using the superframe, devices to which the time slots are allocated may transmit and receive data without contention with other devices. That is, the devices participating in the WPAN may contentionally or contention-freely perform media access to transmit and receive data according to the structure of the superframe decided by the coordinator.

Figure 3A:
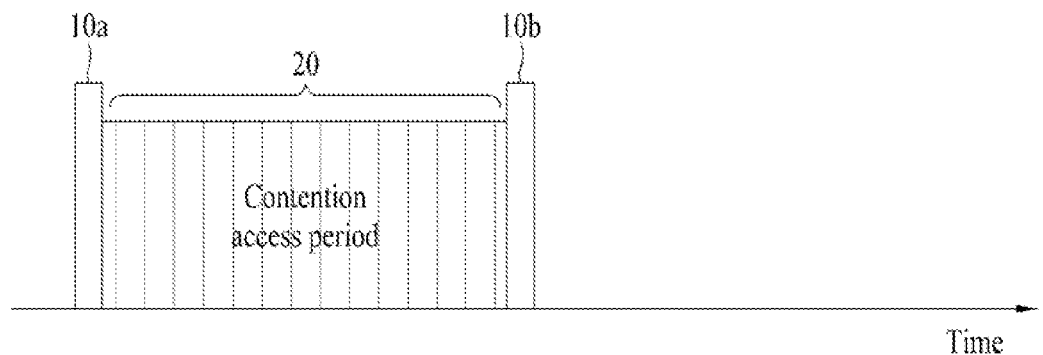
FIGS. 3A to 3C are views showing a structure of a superframe of the IEEE 802.15.4 standard corresponding to an example of the LR-WPAN system.

FIG. 3A show a structure of a superframe indicating a contention access period. Referring to FIG. 3A, the superframe in the LR-WPAN system is configured such that a plurality of time slots 20 (for example, 16 time slots) for data transmission and reception is included between beacon frames 10a and 10b transmitted by the coordinator. In a case in which the structure of the superframe as described above is used, the devices participating in the WPAN may transmit a data frame to the coordinator based on a carrier sense multiple access/collision avoidance (CSMA-CA) method using the time slots in the superframe.

Figure 3B:
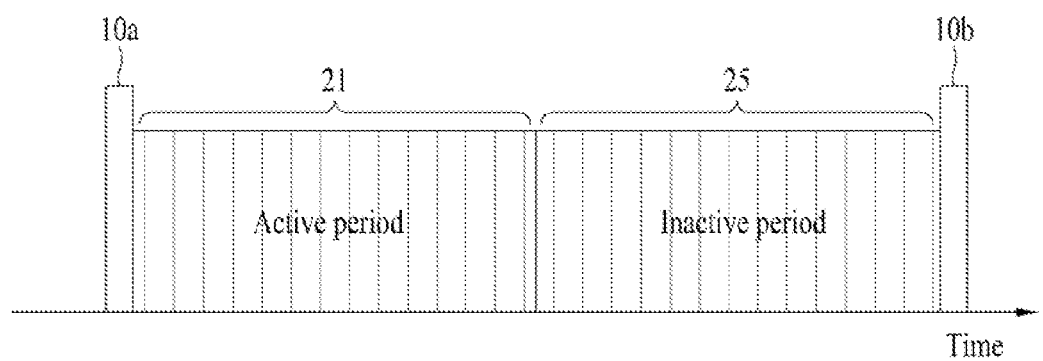

FIG. 3B show a structure of a superframe including an active period and an inactive period. Referring to FIG. 3B, the superframe in the LR-WPAN system is configured such that an active period 21 and an inactive period 25 are included between beacon frames 10a and 10b.

The active period 21 is a period in which transmission and reception of data between the devices are performed. The active period 21 includes time slots for frames used for data transmission and reception. On the other hand, the inactive period 25 is a period in which transmission and reception of data between the devices are not performed.

During the inactive period 25, the coordinator may enter a low power mode.

A ratio of the active period 21 to the inactive period 25 may be referred to as a duty cycle. A value of the duty cycle may be adjusted in consideration of requirements for low power operation of the LR-WPAN system and requirements for coexistence between communication methods using the same physical transmission channel.

Figure 3C:
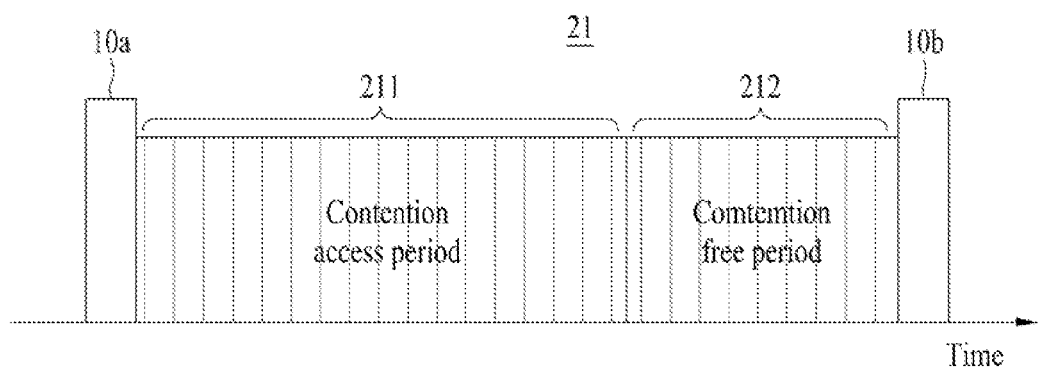

FIG. 3C show a structure of the active period. Referring to FIG. 3C, the active period 21 used for data transmission and reception may include a contention access period (hereinafter, referred to as a CAP) 211 and a contention free period (hereinafter, referred to as a CFP) 212.

The CAP 211 includes time slots in which the devices participating in the WPAN contentionally transmit a data frame. Consequently, a device which will perform communication using the time slots belonging to the CAP 211 between the two beacon frames 10a and 10b has a contention relationship using the CSMA-CA method with other devices.

The CFP 212 includes guaranteed time slots (GTSs), which are time slots allocated for a specific device to transmit a data frame. The GTSs may be used for an application program having a short response time, i.e. low latency, in the device or for an application program requiring a specific transmission bandwidth.

For example, in the IEEE 802.15.4 standard, which corresponds to an example of the LR-WPAN, the CFP 212 may be located after the CAP 2311 in the superframe and may include a maximum of 7 GTSs. In addition, the CFP 212 may be configured such that a plurality of GTSs is allocated for each device.

The coordinator decides to which device each GTS in the CFP 212 is allocated. GTS allocation information of the CFP 212 decided by the coordinator may be transmitted in a state of being included in the first slot of the superframe, i.e. the beacon frame 10a.

Figure 4:
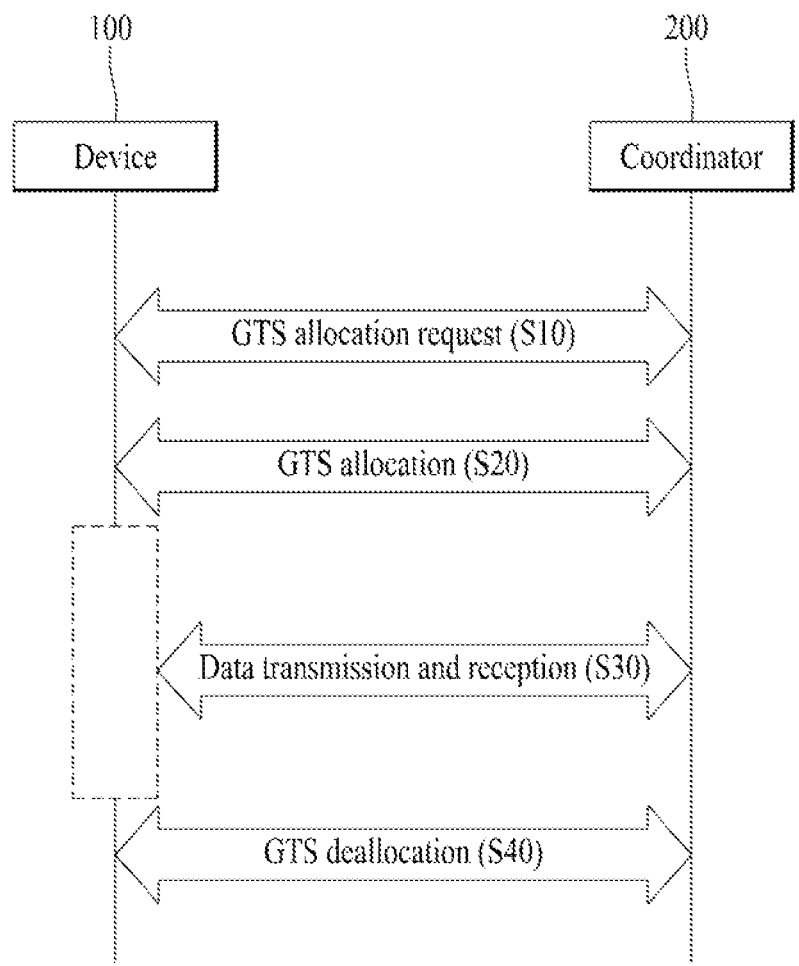
FIG. 4 is a flowchart schematically showing a GTS management procedure in the LR-WPAN system which is adoptable in embodiments of the disclosure.

FIG. 4 is a flowchart schematically showing a GTS management procedure in the LR-WPAN system which is adoptable in embodiments of the disclosure.

First, a device 100 which will perform contention free transmission and reception of data to and from other devices participating in a PAN requests GTS allocation from a coordinator 200 of the PAN (S10). To this end, the device 100 may transmit a GTS request command to the coordinator 200 of the PAN.

Before requesting the GTS allocation, the device 100 may decide values, such as a GTS length and a GTS direction, indicating the number of slots to be allocated as GTSs for the device 100 in the superframe.

Next, the coordinator 200 decides GTSs to be allocated for the device 100 based on the GTS allocation request and transmits the decided GTS allocation information to the device 100 (S20). The GTS allocation information may be transmitted in a state of being included in a beacon frame shown in FIG. 6.

The coordinator 200 decides GTS allocation information for the device 100 based on field values for the GTS allocation request. In addition, the coordinator 200 may decide the number of slots to which the GTSs will be allocated in consideration of communication conditions with the devices participating in the PAN.

Next, upon receiving the decided GTS allocation information, the device 100 transmits and receives data to and from the coordinator 200 using the time slots indicated by the GTS allocation information.

Next, the coordinator 200 informs the device 100 of deallocation of the allocated GTSs according to request of the device 100 or decision of the coordinator 200 (S40).

Figure 5:
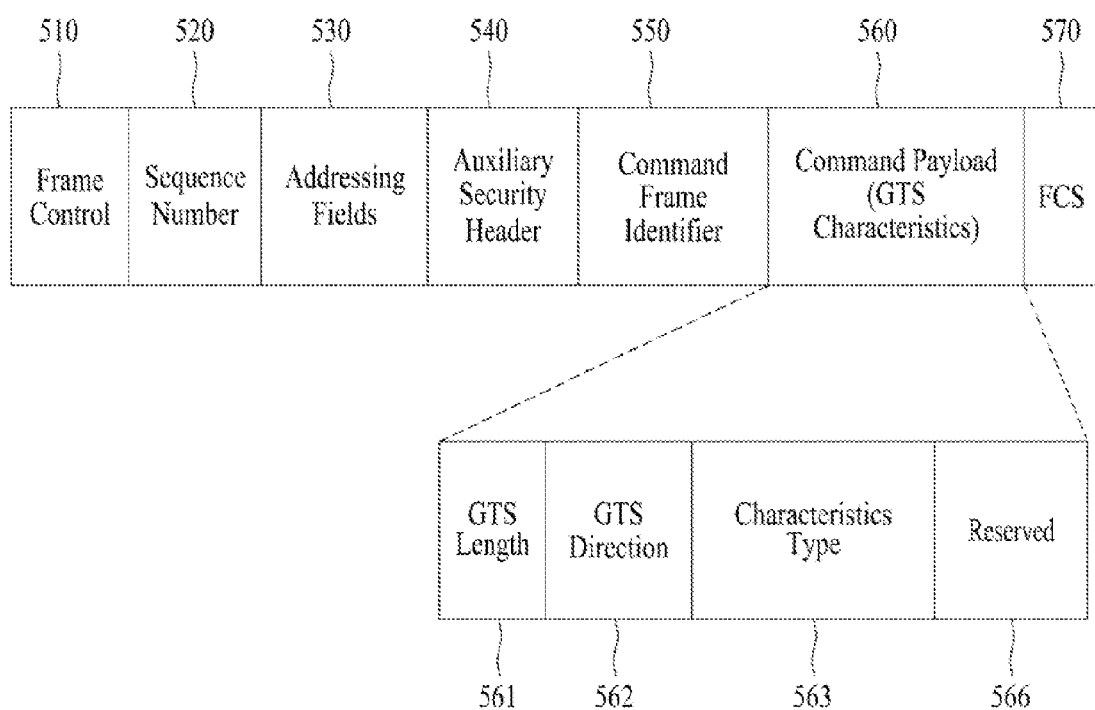
FIG. 5 is a view showing a structure of a GTS request command frame used in the IEEE 802.15.4 standard corresponding to an example of the LR-WPAN.

FIG. 5 is a view showing a structure of a GTS request command frame used in the IEEE 802.15.4 standard corresponding to an example of the LR-WPAN. The GTS request command may be used for the device 100 to request allocation of a new GTS or deallocation of the allocated GTSs from the coordinator 200.

The GTS request command frame 500 may be a MAC frame including a MAC header (hereinafter, referred to as an MHR), a MAC payload, and a MAC footer (hereinafter, referred to as an MFR). Hereinafter, a structure of a GTS request message that the device 100 configures for allocation request of a new GTS will be described with reference to FIG. 5.

Referring to FIG. 5, the MHR may include a frame control field 510, a sequence number field 520, addressing fields 530, and an auxiliary security header field 540.

Of the fields constituting the MHR, the frame control field 510 includes a value indicating that the command frame 50 may be a MAC command frame, the sequence number field 520 may include a current value of macDSN, and the addressing fields 530 may include a transmission address and/or a reception address. In addition, the auxiliary security header field 540 may include information necessary for security processing of the MAC command frame 500.

In addition, referring to FIG. 5, the MAC payload may include a command frame identifier 550 and a command payload 560.

Of the fields constituting the MAC payload, the command frame identifier 550 indicates a command type of the command frame 500. For example, the GTS request command for the GTS allocation request may have a value of '0x09'.

In addition, of the fields constituting the MAC payload, the command payload 560 for the GTS request command may a value indicating GTS characteristics value. The GTS characteristics value 560 includes values indicating GTS characteristics that the device 100 requests from the coordinator 200.

To this end, the GTS characteristics value 560 may include a GTS length field 561, a GTS direction field 562, and a characteristics type field 563.

The GTS length field 561 indicates the number of slots allocated as the GTSs. The device 100 may decide the GTS length field 561 in consideration of a transmission rate of data to be transmitted and received using the GTSs.

The GTS direction field 562 indicates whether the GTSs are allocated for data transmission of the device 100 or date reception of the device 100.

The characteristics type field 563 indicates whether the GTS request command is for GTS allocation or GTS deallocation.

In addition, referring to FIG. 5, the MFR may include a frame check sequence (hereinafter, referred to as a FCS) 570. The FCS may be used to determine whether the MHR and the MAC payload have an error in data transmission.

As described above with reference to FIG. 5, the device 100 may transmit the GTS request command frame 500 to the coordinator 200 to request GTS allocation from the coordinator 200.

Figure 6:
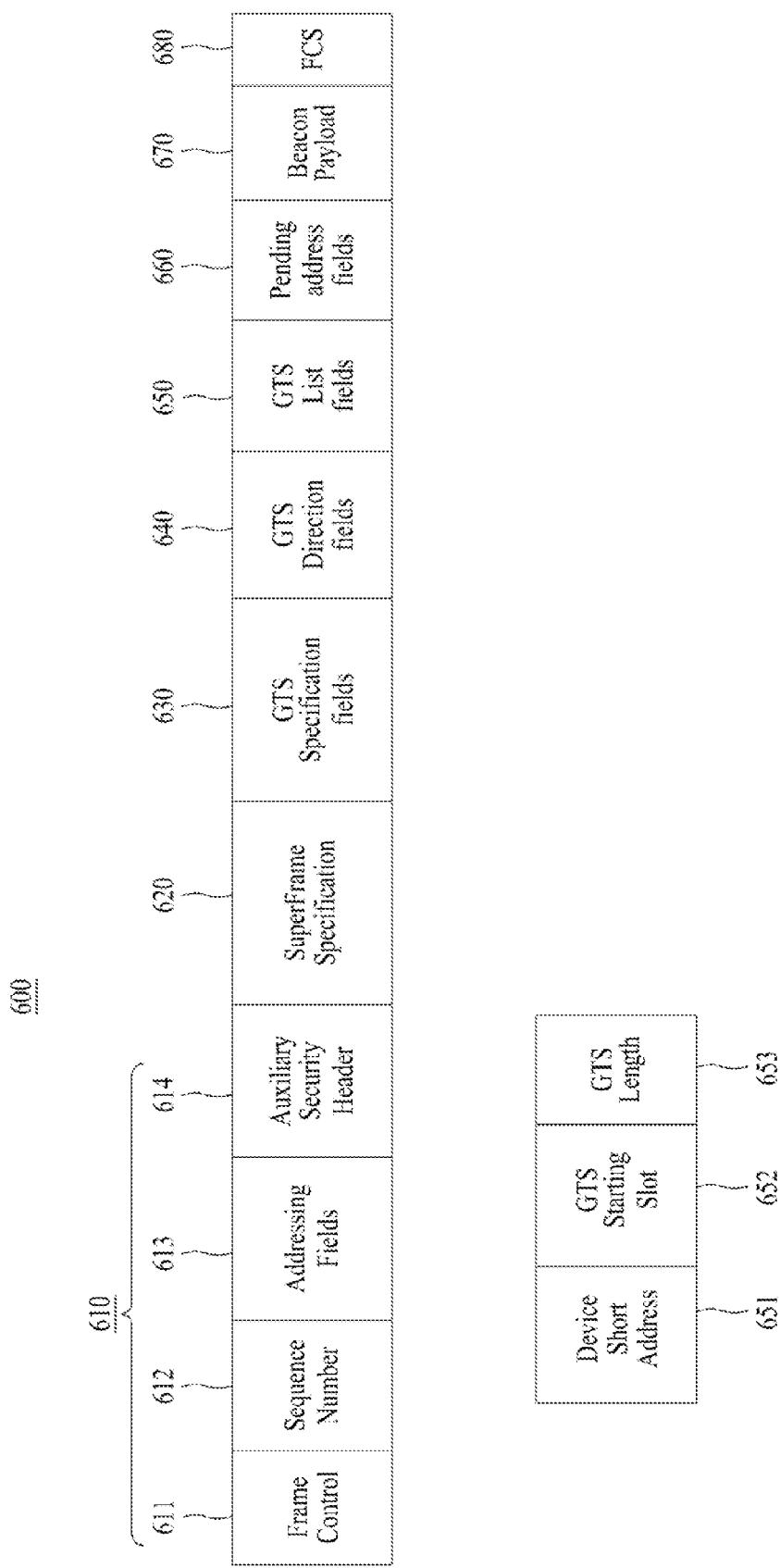
FIG. 6 is a view showing a structure of a beacon frame used in the IEEE 802.15.4 standard corresponding to an example of the LR-WPAN.

FIG. 6 is a view showing a structure of a beacon frame used in the IEEE 802.15.4 standard corresponding to an example of the LR-WPAN. The beacon frame 600 may be used to synchronize devices participating in a PAN established by the coordinator 200 like the device 100, to identify the PAN, and to indicate a structure of the superframe.

The beacon frame 600 may be a MAC frame including an MHR 610, a MAC payload, and an MFR 680.

Referring to FIG. 6, the MHR 610 of the beacon frame 600 may include a frame control field 611, a sequence number field 612, addressing fields 613, and an auxiliary security header field 614.

The frame control field 611 may include a frame type subfield indicating that a type of the MAC frame is a beacon frame and a source addressing mode subfield, which is information for identifying the coordinator 200 transmitting the beacon frame 60. The sequence number field 612 may include a current value of macDSN. The addressing fields 613 may include information about a source device and a source PAN.

In addition, referring to FIG. 6, the MAC payload of the beacon frame 600 may include a superframe specification field 620, a GTS specification field 630, a GTS direction field 640, a GTS list field 650, a pending address field 660, and a beacon payload 670.

The superframe specification field 620 may include a beacon sequence, a superframe sequence, the last CAP slot, battery lifespan information, and whether the beacon frame is transmitted from the PAN coordinator.

The GTS specification field 630, the GTS direction field 640, and the GTS list field 650 may be referred to as GTS fields.

The GTS specification field 630 may include a GTS descriptor count subfield. The GTS descriptor count subfield indicates the number of GTS descriptors which will be included in the GTS list field 650. For example, in a case in which the size of the GTS descriptor count subfield is 3 bits, the GTS list field 650 may include a maximum of 7 GTS descriptors.

The GTS direction field 640 may include a GTS directions mask subfield indicating directions of GTSs in the subframe. That is, the GTS directions mask subfield may indicate whether each GTS included in the GTS list field is for data transmission (transmit-only) or data reception (receive-only).

The GTS list field 650 may include a GTS descriptor field indicating GTS allocation information. The GTS list field 650 may include one or more GTS descriptor fields based on a value indicated by the GTS descriptor count subfield. In addition, whether each GTS descriptor field is used for data transmission or data reception may be decided by the GTS directions mask subfield.

As shown in FIG. 6, the GTS descriptor fields included in the GTS list field 650 may include a device short address field 651, a GTS starting slot field 652, and a GTS length field 653.

The device short address field 651 indicates an address of a device to which the GTSs are allocated by the GTS descriptor. That is, the GTSs associated with the GTS descriptor field are allocated to the device 100, the device short address field 651 has an address of the device 100.

The GTS starting slot field 652 indicates information about a superframe slot at which the GTS starts.

The GTS length field 653 indicates the number of GTSs successively activated in the superframe.

As described above with reference to FIG. 6, the coordinator 200 may transmit the beacon frame 600 to the device 100 to inform of information about GTSs allocated for the device 100.

Figure 7:
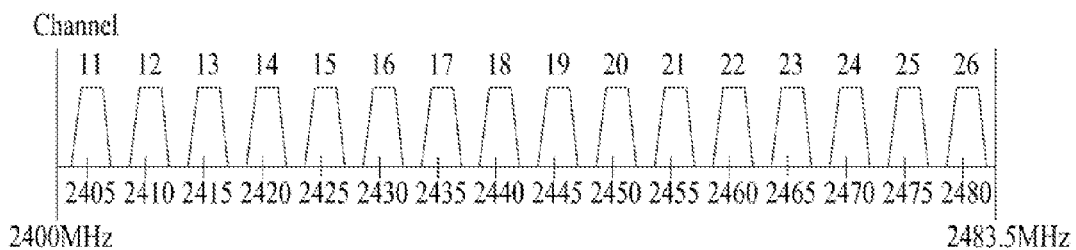
FIG. 7 is a view showing an example of channel arrangement in an IEEE 802.15.4 system.

FIG. 7 is a view showing an example of channel arrangement in an IEEE 802.15.4 system.

As can be seen from the FIG. 7, an IEEE 802.15.4 system operating in a band of 2400 MHz has a channel spacing of 5 MHz.

Systems based on the IEEE 802.15.4 system adopt the above-defined channel arrangement. For example, a medical body area network (MBAN) system adopts the above-defined channel arrangement.

The MBAN system has been designed to provide a flexible platform for wireless networking of a plurality of sensors used to monitor physiological data of patients in healthcare facilities, such as a hospital.

The MBAN system operates in a band of 2360 MHz to 2400 MHz based on the IEEE 802.15.4 system. The maximum emission bandwidth of the MBAN system is limited to 5 MHz.

The frequency band of 2360 MHz to 2400 is already allocated for other wireless communication systems. The MBAN system operates based on a cognitive radio technology. The cognitive radio technology is a communication technology in which a network or a wireless communication device actively detects and determines a peripheral communication environment to adaptively change transmission/reception characteristics, such as a frequency band, transmit power, and a coding method, for optimal communication. At this time, in a case in which the cognitive radio device detects use of a licensed user or a primary user in a frequency band which the cognitive radio device will use, the cognitive radio device operates in a manner in which communication of the corresponding user is not disturbed, first of all.

To this end, in a case in which the MBAN system operates in a frequency band of 2360 MHz to 2390 MHz, MBAN devices need to operate inside registered healthcare facilities, in principle. That is, in collaboration with the licensed user or the primary user, the MBAN system needs to control usage in 2360 MHz to 2390 MHz. When the licensed user the primary user uses the above frequency band, all operations in the above frequency band need to be initialized and to be restarted using a frequency band of 2390 MHz to 2400 MHz.

When the MBAN devices move outdoors, the MBAN devices need to stop an operation or to change the frequency band to 2390 MHz to 2400 MHz used as a basic frequency band and to perform communication. When the MBAN devices operate in a frequency band of 2390 MHz to 2400 MHz, the MBAN devices may perform communication both indoors and outdoors.

Figure 8:
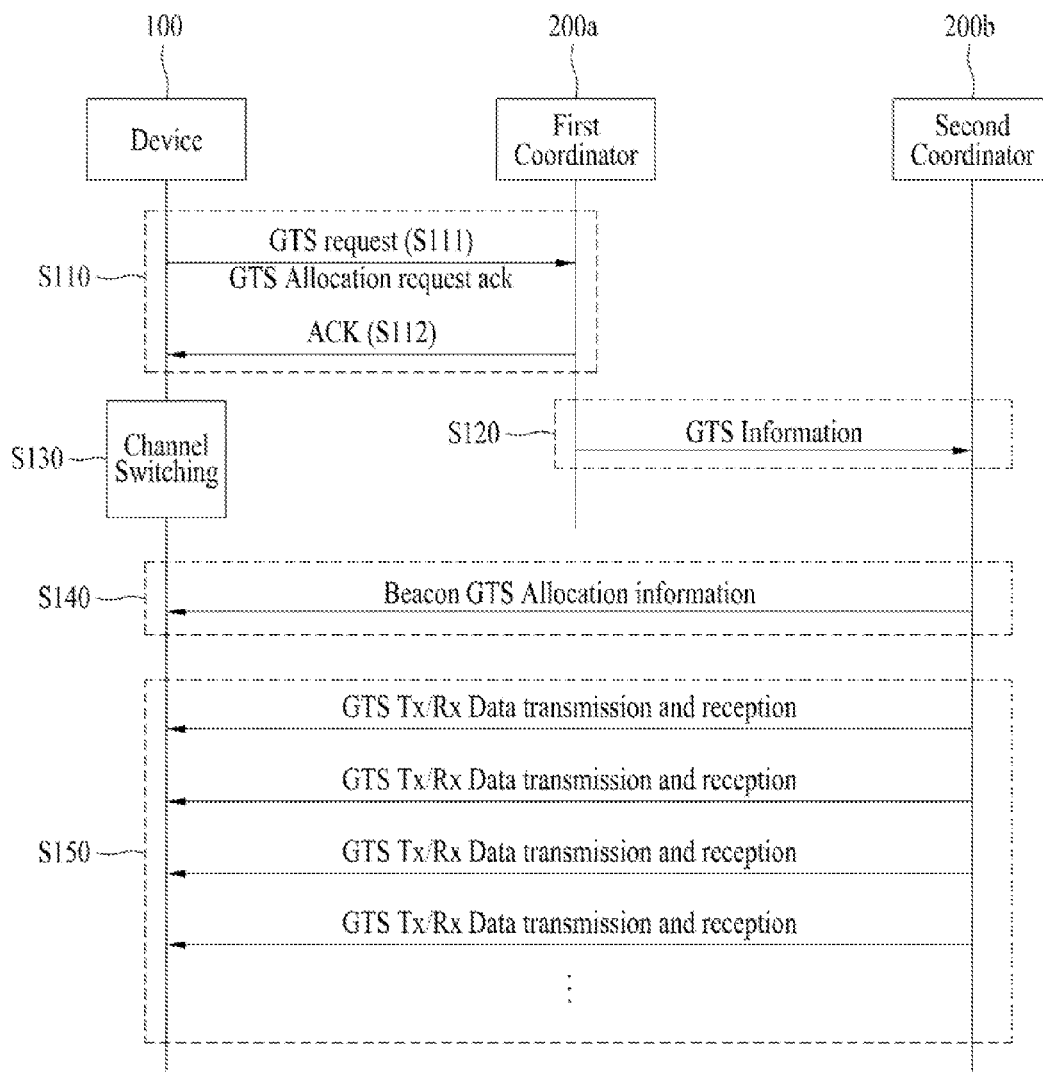
FIG. 8 is a view showing an example of transmitting and receiving data in a WPAN system according to an embodiment of the disclosure.

FIG. 8 is a view showing an example of transmitting and receiving data in a WPAN system according to an embodiment of the disclosure.

In this embodiment, in order to switch an operating channel, a device (or mobile station) of the WPAN system requests a transmission band for contention free data transmission and reception from a coordinator operating in a channel to be switched in advance and transmits and receives data using the transmission band allocated to the device after channel switching. The medical body area network (MBAN) system is an example of the WPAN system in which such an operating channel is switched.

Hereinafter, the above process will be described with reference to FIG. 8.

The WPAN device transmits a transmission band request message for contention free data transmission and reception to a WPAN coordinator (hereinafter, referred to as a first coordinator) under communication through any frequency channel (hereinafter, referred to as a first frequency channel) (S110). At this time, the request transmission band is not for transmission and reception of data to and from the first coordinator but transmission and reception of data to and from another WPAN coordinator (hereinafter, referred to as a second coordinator) to and from which the device will transmit and receive data after channel switching. Here, the transmission band for contention free data transmission and reception may be a guaranteed time slot (GTS).

The transmission band request process (S110) may include the device 100 transmitting a transmission band request to the coordinator 200*a* of the WPAN (S111) and the first coordinator 200*a*, receiving the request, transmitting a reception acknowledge message ACK to the transmission band request to the device 100 (S112).

The transmission band request includes information for requesting the device 100 to allocate the transmission band for contention free data transmission and reception. At this time, the transmission band request may be a GTS request command. The GTS request command will be described in detail with reference to FIG. 9. The GTS request command may include an indicator indicating GTS request from the second coordinator.

The first coordinator 200*a*, receiving the transmission band request, checks that the transmission band has not been requested therefrom and transmits the transmission band request information to the coordinator 200*b* from which the device 100 wishes to allocate the transmission band through a backbone network (S120). The transmission band request information may include a long/short address of the device 100, a long/short address of the first coordinator 200*a*, and a channel switching time of the device 100.

The second coordinator 200*b*, receiving the transmission band request information, allocates the transmission band for the device 100 based on the received information, resource conditions, etc. Subsequently, the second coordinator 200*b* transmits transmission band allocation information. At this time, the transmission band allocation information may be transmitted in a state of being included in a beacon frame. In a case in which the transmission band is a GTS, the transmission band allocation information may be transmitted in a state of being included in a GTS descriptor field of the beacon frame.

The device 100 performs channel switching (S130). An example of the channel switching is that the device of the MBAN system switching an operating channel from a channel in a band of 2360 MHz to 2390 MHz to a channel in a band of 2390 MHz to 2400 MHz.

After the channel switching, the device 100 receives the transmission band allocation information transmitted by the second coordinator 200b (S140).

The device 100, receiving the transmission band allocation information, transmits and receives data to and from the second coordinator 200b using the allocated transmission band (S150).

FIG. 9 is a view showing a structure of a GTS request command frame according to an embodiment of the disclosure.

The GTS request command may be used for the device 100 to request allocation of a new GTS from the second coordinator 200b.

Figure 9A:
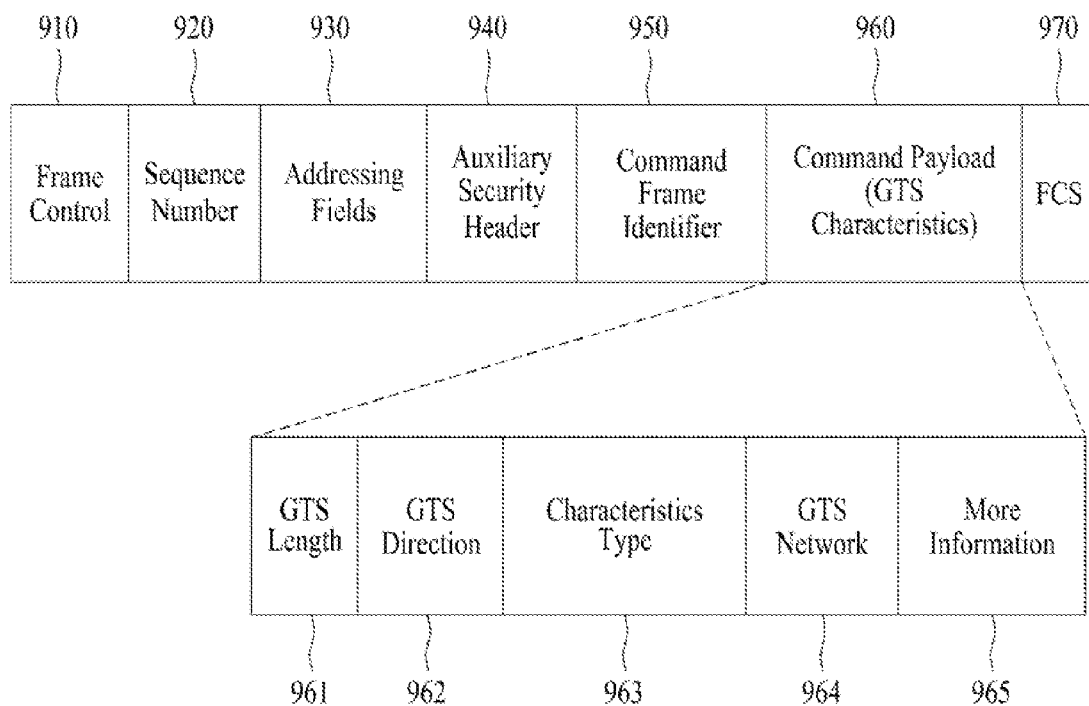
FIGS. 9A and 9B are views showing a structure of a GTS request command frame according to an embodiment of the disclosure.

The GTS request command frame 500 of FIG. 9A may be a MAC frame including a MAC header (hereinafter, referred to as an MHR), a MAC payload, and a MAC footer (hereinafter, referred to as an MFR).

A frame control field 910, a sequence number field 920, addressing fields 930, an auxiliary security header field 940, and a command frame identifier field 950 are the same as described with reference to FIG. 5.

In addition, a GTS length field 961, a GTS direction field 962, and a characteristics type field 963 of a GTS characteristics field 960 are also the same as described with reference to FIG. 5.

In the GTS request command frame according to the embodiment of the disclosure, the GTS characteristics field 960 may further include a GTS network field 964 and a more information field 965. The GTS network field 964 functions as an indicator indicating the device requests a GTS from the WPAN coordinator (second coordinator) to and from which the device transmits and receives data after channel switching. For example, in a case in which the GTS network field 964 is 0, it means that the device requests a GTS from the current coordinator (first coordinator). On the other hand, in a case in which the GTS network field 964 is 1, it means that the device requests a GTS from the second coordinator.

The more information field 965 may include more information about the second coordinator.

For example, if the first coordinator does not know information about the second coordinator (in a case in which the GTS network field 964 is 1), the more information field 965 is set to 1 such that more information about the second coordinator is further transmitted. If the first coordinator knows information about the second coordinator, the more information field 965 is set to 0 such that no more information about the second coordinator is transmitted.

Figure 9B:
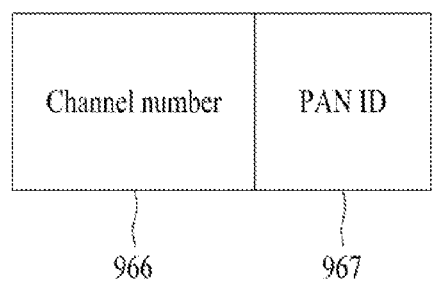

FIG. 9B shows an example of a field further included in the GTS characteristics field 960 in a case in which the more information field 965 is 1. At this time, a channel number field 966 indicates a channel used to transmission and reception to and from the second coordinator and a PAN identifier (PAN ID) field 967 is an identifier of the second coordinator.

Figure 10:
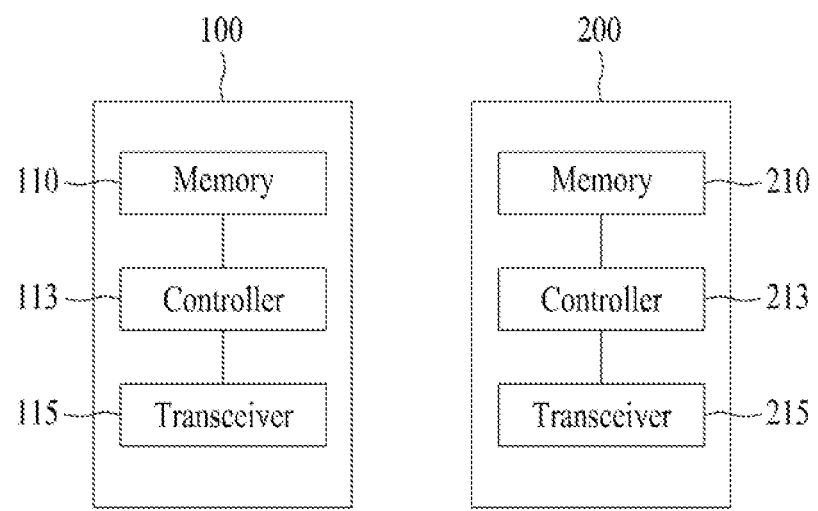
FIG. 10 is a block diagram showing configurations of a device and a coordinator of the LR-WPAN system according to embodiments of the present invention.

FIG. 10 is a block diagram showing configurations of a device and a coordinator of the LR-WPAN system according to embodiments of the present invention.

As show in FIG. 10, the device 100 participating in the WPAN includes a memory 111, a controller 113, and a transceiver 115 and the coordinator 200 constituting the WPAN includes a memory 211, a controller 213, and a transceiver 215.

The memories 111 and 211 store the methods shown in FIGS. 8 and 9, respectively. The controllers 113 and 213 perform the methods stored in the memories 111 and 211 to control the memories 111 and 211 and the transceivers 115 and 215.

The embodiments of the disclosure described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. In addition, claims that are not explicitly cited in each other in the appended claims may be presented in combination as an embodiment of the present invention or included as a new claim by a subsequent amendment after the application is filed.

The invention claimed is:

1. A data transmission method performed by a device in a wireless personal area network (WPAN) system, the data transmission method comprising:

transmitting, by the device, to a first coordinator operating in a first frequency channel, a message including a transmission band request for requesting a transmission band for contention-free transmission and reception of data, the transmission band request including a first field configured as a first value or a second value and a second field configured as a third value or a fourth value, the first field being for indicating the first coordinator or a second coordinator operating in a second frequency channel different from the first frequency channel;

when the first field is configured as the first value, receiving transmission band allocation information corresponding to the transmission band request from the first coordinator; and when the first field is configured as the second value, switching an operating channel of the device from the first frequency channel to the second frequency channel; and receiving transmission band allocation information corresponding to the transmission band request from the second coordinator through the second frequency channel,
wherein, when the first field is configured as the first value, the second field is configured as the third value indicating that the transmission band request does not include information on the second coordinator, and
wherein, when the first field is configured as the second value, the second field is configured as the fourth value indicating that the transmission band request includes information on the second coordinator.

2. The data transmission method according to claim 1, wherein the transmission band for contention-free transmission and reception of data is a guaranteed time slot (GTS).

3. The data transmission method according to claim 2, wherein the message is a GTS request command.

4. The data transmission method according to claim 3, wherein the second value corresponds to an indicator indicating that the GTS is requested from the second coordinator.

5. The data transmission method according to claim 4, wherein the first field and the second field are contained in a GTS network field.

6. The data transmission method according to claim 4, wherein the GTS request command further comprises a channel number of the second frequency channel.

7. The data transmission method according to claim 2, wherein the transmission band allocation information is received in a state of being contained in a beacon frame.

8. The data transmission method according to claim 7, wherein the transmission band allocation information is received through a GTS descriptor in the beacon frame.

9. The data transmission method according to claim 1, wherein the WPAN system is a medical body area network (MBAN) system.

10. A transmission band allocation method in which a first coordinator operating in a first frequency channel of a wireless personal area network (WPAN) system allocates a transmission band to a device, the transmission band allocation method comprising:
receiving a transmission band request requesting for a transmission band for contention-free transmission and reception of data for the device, the transmission band request including a first field configured as a first value or a second value and a second field configured as a third value or a fourth value, the first field being for indicating the first coordinator or a second coordinator operating in a second frequency channel, the second frequency channel being different from the first frequency channel;
when the first field indicates the first value, allocating the transmission band for contention-free transmission and reception of data based on the received information;
transmitting transmission band allocation information to the device through the first frequency channel; and
when the first field is configured as the second value, transmitting information on the transmission band request to the second coordinator based on the second field,
wherein, when the first field is configured as the first value, the second field is configured as the third value indicating that the transmission band request does not include information on the second coordinator, and
wherein, when the first field is configured as the second value, the second field is configured as the fourth value indicating that the transmission band request includes information on the second coordinator.

11. The transmission band allocation method according to claim 10, wherein the transmission band for contention-free transmission and reception of data is a guaranteed time slot (GTS).

12. The transmission band allocation method according to claim 10, wherein the information comprises at least one selected from among an address of the device, an address of the another coordinator, and time information on which the device will change its operating frequency channel.

13. A mobile station of a wireless personal area network (WPAN) system, the mobile station comprising:
a transceiver configured to perform communication with a coordinator; and
a controller configured to:
control the transceiver to transmit, to a first coordinator operating in a first frequency channel, a transmission band request for requesting a transmission band for contention-free transmission and reception of data, the transmission band request including a first field configured as a first value or a second value and a second field configured as a third value or a fourth value, the first field being for indicating the first coordinator or a second coordinator operating in a second frequency channel different from the first frequency channel,
when the first field is configured as the first value, control the transceiver to receive transmission band allocation information corresponding to the transmission band request from the first coordinator; and
when the first field is configured as the second value, control an operating frequency channel of the device to be switched from the first frequency channel to the specific frequency channel,
control the transceiver to receive transmission band allocation information corresponding to the transmission band request from the second coordinator through the second frequency channel,
wherein, when the first field is configured as the first value, the second field is configured as the third value indicating that the transmission band request does not include information on the second coordinator, and
wherein, when the first field is configured as the second value, the second field is configured as the fourth value indicating that the transmission band request include information on the second coordinator.

14. The mobile station according to claim 13, wherein the transmission band for contention-free transmission and reception of data is a guaranteed time slot (GTS).

* * * * *